Figures 4, 5:
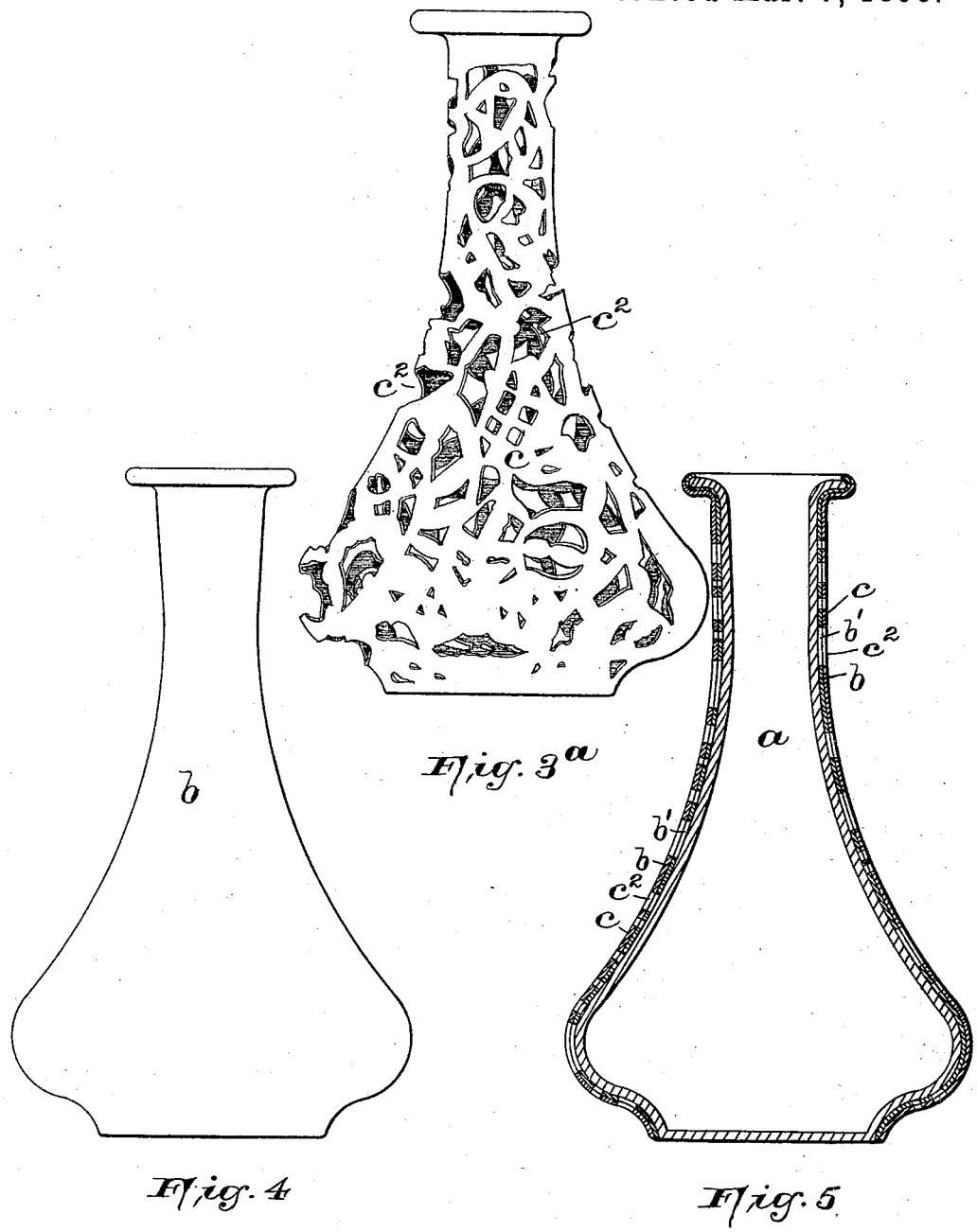

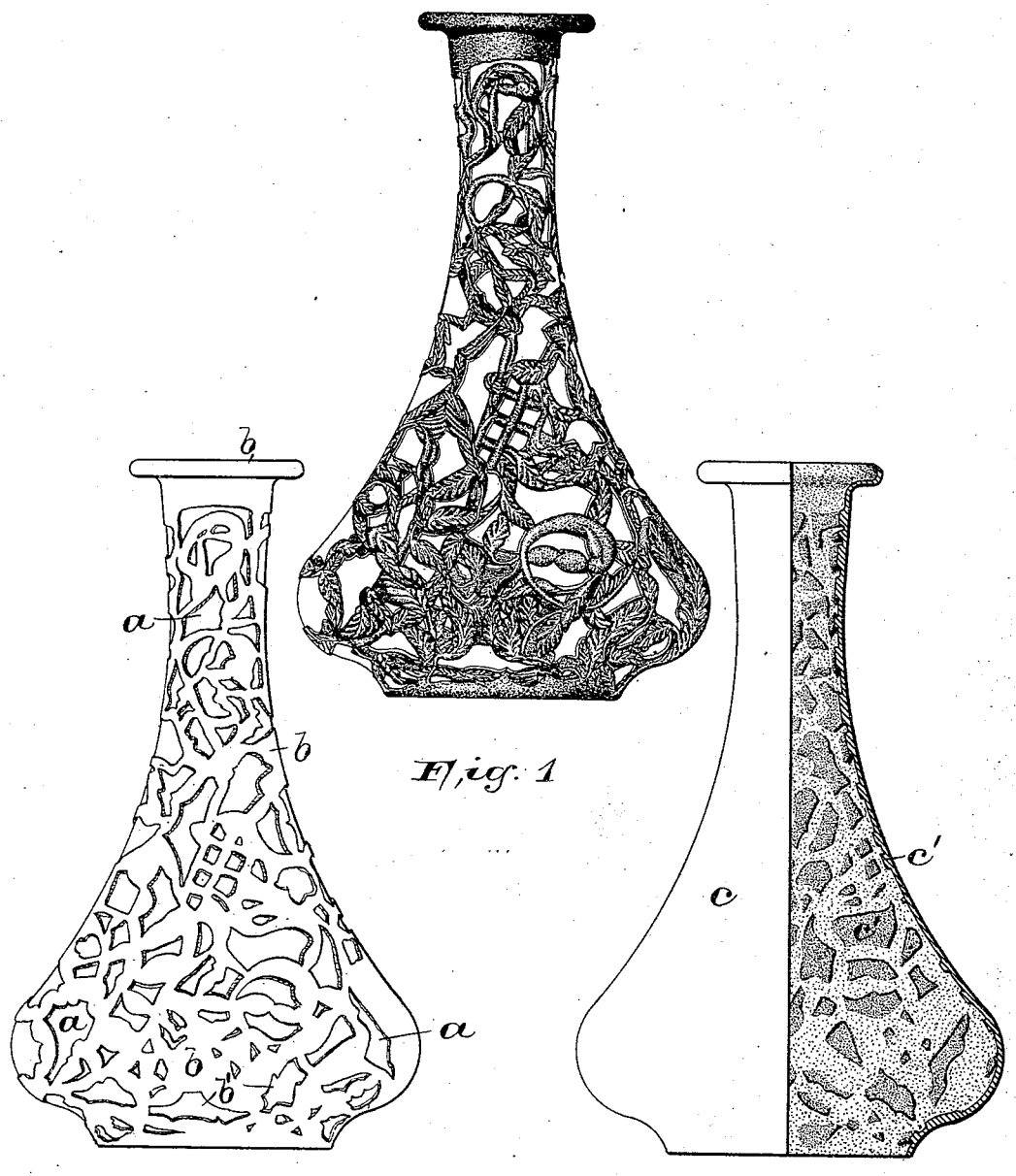

(No Model.) 2 Sheets—Sheet 2.

J. H. SCHARLING.
METHOD OF PRODUCING RAISED METALLIC DESIGNS ON BOTTLES, VASES, OR SIMILARLY SHAPED ARTICLES AND MEANS THEREFOR.

No. 492,840. Patented Mar. 7, 1893.

Fig. 3ª

WITNESSES:
Wm. H. Camfield, Jr.
B. Mortimer Trusdell.

INVENTOR:
John H. Scharling,
BY Fred C. Fraentzel, ATT'Y.

THE NORRIS PETERS CO., PHOTO-LITHO., WASHINGTON, D. C.

UNITED STATES PATENT OFFICE.

JOHN H. SCHARLING, OF NEWARK, NEW JERSEY.

METHOD OF PRODUCING RAISED METALLIC DESIGNS ON BOTTLES, VASES, OR SIMILARLY-SHAPED ARTICLES AND MEANS THEREFOR.

SPECIFICATION forming part of Letters Patent No. 492,840, dated March 7, 1893.

Application filed March 10, 1892. Serial No. 424,384. (No model.)

*To all whom it may concern:*

Be it known that I, JOHN H. SCHARLING, a citizen of the United States, residing at Newark, in the county of Essex and State of New Jersey, have invented certain new and useful Improvements in Methods for Producing Raised Metal Designs and Means Therefor; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a new method of producing raised metal designs on articles, such as glass or other ware, commonly known under the name of "solid deposit ware," and my new method of producing designs of the class to be more fully described hereinafter, is applicable to all cases where surface ornamentation is to be produced, either upon glass, metal or wood, and it is not limited to any particular design.

The invention therefore consists in a new method of producing such designs for this purpose, which will be more fully described hereinafter, and also of a flexible or other covering, such as rubber or other analogous material, provided with perforations or openings which correspond in outline to the outline of the design itself, to be produced upon the article of ware by means of my newly discovered method.

My new method can be used in providing any article of ware, and which may be of any shape, with a design; the design in the present instance being produced in a metal with which a glass bottle or vase has been covered.

In the accompanying drawings, Figure 1 is an elevation of a glass bottle or vase provided with a covering of metal, having openings therein, in outline of the desired design, produced by my new method, to expose the glass in places and the solid parts of the metal covering having engraved or otherwise wrought therein any suitable design. The view represents the finished article. Fig. 2 is a similar view of a glass bottle or vase provided with a covering of metal in which the openings or perforations have been cut out by means of a tool, the view represents the shape and form of a former upon which a flexible covering such as rubber or other analogous material is formed, and which covering is to be used in the method of producing the designs on other articles of ware. Fig. 3 is a part elevation and part section of a rubber or other suitable covering formed over such former. Fig. 3ª is an elevation of said covering through which openings in outline of the design on the former have been pierced. Fig. 4 is an elevation of the bottle or vase provided with the solid covering of metal, such as silver or any other metal, over which the flexible covering represented in Figs. 3 and 3ª is drawn, previous to dipping the article in an acid bath. Fig. 5 is a vertical section, showing the arrangement of the glass body of the bottle and the metallic and rubber or other flexible coverings.

In carrying out my invention, I first take an ordinary article of ware, such as a glass bottle $a$ represented in the drawings and provide the same with a thin outer covering or layer of metal $b$, as illustrated in Fig. 4, and in this metallic covering is formed any suitable design, which is represented in outline by the openings or perforations $b'$, as shown in Fig. 2, and which are cut out therein in any well-known manner, by means of a cutting tool, the design having been previously painted or outlined upon said metal covering in the usual manner, whereby it stands out in bold relief upon the former. Upon such former is formed a plain flexible covering, such as rubber or other analogous material, by means of the well-known vulcanizing process, or in any other known manner. I thereby obtain a flexible covering $c$ corresponding in general appearance to that of the former, which, flexible covering, as will be evident from Fig. 3, will be perfectly smooth upon its outer surface and will be provided on its inner surface with the raised portions $c'$, where the rubber has assumed an increased thickness, owing to the cause that the plastic material in forming the covering $c$ has found its way into the openings $b'$ in the former, as will be readily understood. After the rubber covering is removed from the former and reversed so that the raised portions $c'$ will be outside, the workman takes a sharp knife or other tool adapted for the purpose and removes all of said raised portions by piercing or cutting through the material, whereby the flexible covering becomes provided with holes or perforations $c^2$, which conform in outline with the design to be produced upon the plain article represented in Fig. 4, which is generally any glass article covered with a thin coating or layer of metal $b$, such as silver or any other precious metal. Upon the article of ware, thus provided with the outer metal covering, I then draw the flexible covering $c$, illustrated in Fig. 3ª.

The flexible covering, which has been pierced in the manner just above described, readily adapts itself to the shape of the metal-covered article and firmly adheres to the same, and the next step in the process is to remove or partially remove the solid portions of metal exposed to view through the holes or openings in the flexible rubber or other covering. This can be done in several ways, and I will now describe two of the preferred methods of removing the exposed metal surfaces which are exposed through the openings in the flexible covering. The first method is by dipping the metal covered article on which the perforated flexible cover has been arranged, as described, into an acid bath, whereby the exposed metal surface can be entirely eaten away so that the glass body underneath or other metallic surface appears, or the exposed metal surfaces may be only partially etched away, as will be understood and the bottle or vase assumes the general appearance illustrated in Fig. 2. The second method is to treat the covered article to sand-blast, and the effect will be that the sand roughens the exposed metal surfaces. The rubber or other flexible covering is then removed and the bright metal surfaces are painted over with a "resist" or covered with wax and the article dipped into the acid bath whereby the roughened portions of the metal can be entirely or only partially etched away. The remaining portions of the metallic covering which have not been affected by the acid on account of their having been protected by the rubber or other covering in the first case, or by the "resist" in the second case, are then provided with any suitable design which can be engraved or otherwise wrought therein, and the article assumes the general appearance illustrated in Fig. 1.

Of course it will be understood that the flexible covering $c$ can be used a great many times on articles of the same shape until it is finally worn out and becomes useless when a new flexible covering can be made from the former.

It will be understood that this method of producing designs is not limited to any particular kind of metal, nor to metal coverings on glass-ware solely, but it may be employed on articles consisting of two or more layers of different metals, in which case the outer covering of metal can be etched away by my new method until the next layer appears, providing, however, that the acid bath used is not of sufficient strength to attack the next layer of metal. I may also use my new process or method for etching on wood, or it may be used in ornamenting watch-cases or jewelry of all kinds.

I do not wish to limit myself to any particular design made in this manner, as any indefinite number of designs can be reproduced in this manner.

Instead of cutting out the original design on the metal covered bottle termed the "former," in the manner stated herein above, I can take a suitable bottle, as for instance a decanter, and by the electro-plating process deposit a thin coating of silver or other metal on its surface, about one sixteenth of an inch thick. This surface is polished and any suitable design painted thereon with etching paint, i. e., I paint the parts around the design, leaving the design exposed. The decanter is now placed in an etching solution and the parts not painted over are etched through to about two-thirds of the depth of the metal. The paint or resist is then washed off and I have the design etched in the surface of the metal, leaving the surrounding parts raised. Upon this "former," I then bind a sheet of rubber and vulcanize the same on its surface, a suitable hole being cut in the bottom of the rubber cover to allow it to be taken from the "former." The rubber cover is then removed, reversed, and the raised portions thereon cut away in the same manner, as has been previously stated.

Having thus described my invention, what I claim is—

1. A flexible etching pattern, consisting of a continuous piece of rubber, or other analogous material, formed of a shape similar to the contour of a bottle, vase, or other similar article, having a design pierced in outline therein, said pattern being adapted to be stretched over a similarly shaped article, whereby the exposed surfaces of said article may be etched, substantially as and for the purposes set forth.

2. The method herein described, of producing designs on articles of ware such as a bottle, vase, or other similarly shaped article provided with an outer covering of metal, drawing over the same a flexible cover of rubber or other analogous material, consisting of a continuous piece, formed in shape similar to the contour of the bottle, vase, or other similarly shaped article, having a design pierced in outline therein, and removing or etching the metallic surfaces exposed through the openings in the flexible covering, until the surface of the article underneath is exposed, and finally removing the said flexible covering, substantially as and for the purposes set forth.

3. The herein described process, for producing raised metal designs on articles of glass, or other ware, which consists as follows, to wit:—first, covering a bottle, vase, or other similarly shaped article, with a thin coating of metal by means of the electro-plating process; second, painting a design thereon with a resist paint; third, etching the exposed parts of the metal surface; fourth, covering the article with rubber and vulcanizing the same upon its surface, and forming raised portions on the inner surfaces of the rubber covering thus formed; fifth, removing said vulcanized etching pattern from the article used as a former; and finally, reversing the rubber covering to bring its inner surfaces on the outside and cutting away the raised portions thereon, substantially as and for the purposes set forth.

4. The herein described process, for producing raised metal designs on articles of glass, or other ware, which consists as follows, to wit:—first, covering a bottle, vase, or other similarly shaped article with a thin coating of metal by means of the electro-plating process; second, painting a design thereon with a resist paint; third, etching the exposed parts of the metal surface; fourth, covering the article with rubber and vulcanizing the same upon its surface, and forming raised portions on the inner surfaces of the rubber covering thus formed; fifth, removing said vulcanized etching pattern from the article used as a former; sixth, reversing the rubber covering to bring its inner surfaces on the outside and cutting away the raised portions thereon, seventh, drawing said continuous rubber etching pattern upon another metal covered and similarly shaped bottle, vase, or other like article; eighth, removing or partially removing the exposed metallic surfaces by etching or sand-blast; and finally, removing the etching pattern, all substantially as and for the purposes set forth.

In testimony that I claim the invention set forth above I have hereunto set my hand this 8th day of March, 1892.

JOHN H. SCHARLING.

Witnesses:
FREDK. C. FRAENTZEL,
WM. H. CAMFIELD, Jr.